(12) United States Patent
Gretz

(10) Patent No.: US 9,136,679 B1
(45) Date of Patent: Sep. 15, 2015

(54) NON-METALLIC SPLIT BUSHING AND METHOD FOR PREVENTING ABRASION OF ELECTRICAL CABLES IN PIPE AND CONDUIT

(71) Applicant: Thomas J. Gretz, Port St. Lucie, FL (US)

(72) Inventor: Thomas J. Gretz, Port St. Lucie, FL (US)

(73) Assignee: Arlington Industries, Inc., Scranton, PA (US)

(*) Notice: Subject to any disclaimer, the term of this patent is extended or adjusted under 35 U.S.C. 154(b) by 0 days.

(21) Appl. No.: 14/088,535

(22) Filed: Nov. 25, 2013

(51) Int. Cl.
*H02G 3/18* (2006.01)
*H02G 3/04* (2006.01)

(52) U.S. Cl.
CPC .................................. *H02G 3/0418* (2013.01)

(58) Field of Classification Search
CPC ............. H02G 3/00; H02G 3/02; H02G 3/22; H02G 3/24; H02G 3/26; H02G 3/36; H02G 3/0418; B60R 16/0207; B60R 16/0215; B60R 16/0222

USPC .......... 174/650, 656, 664, 652, 153 G, 152 R, 174/137 R, 152 G, 155, 154, 156, 564, 135, 174/655; 16/2.1, 2.2; 248/56, 68.1, 74.1; 439/100, 92, 271, 272, 278
See application file for complete search history.

(56) References Cited

U.S. PATENT DOCUMENTS

| | | | | |
|---|---|---|---|---|
| 3,967,872 | A * | 7/1976 | Mooney et al. | 439/100 |
| 4,159,859 | A * | 7/1979 | Shemtov | 439/100 |
| 4,189,198 | A * | 2/1980 | Reichman | 439/100 |
| 7,534,965 | B1 * | 5/2009 | Thompson | 174/153 G |
| 7,751,676 | B2 * | 7/2010 | Riley et al. | 174/564 |
| 7,915,545 | B1 * | 3/2011 | Bixler et al. | 174/664 |
| 8,033,408 | B2 * | 10/2011 | Makela et al. | 174/152 G |
| 8,231,392 | B2 * | 7/2012 | Garvin | 439/100 |
| 8,419,449 | B1 * | 4/2013 | Smith | 439/92 |
| 8,882,517 | B2 * | 11/2014 | Smith et al. | 439/92 |

* cited by examiner

*Primary Examiner* — Angel R Estrada

(57) ABSTRACT

A split bushing and method for protecting electrical cables from abrasion by the cut edges of pipe or electrical conduit, also known as electrical metal tubing or EMT. The split bushing includes a substantially ring-shaped body and two cable guides extending from the outer periphery. The bushing includes an end wall and a raised area on the end wall adjacent the split. An overlap extends from the raised area. The bushing includes two ends and two cable guides adjacent the split. After being attached to the end of an electrical conduit, a cable tie is extended through the cable guides and tightened to secure the split bushing tightly to the electrical conduit. The overlap ensures that the entire inner periphery of a conduit will be covered by the bushing when secured thereto.

20 Claims, 6 Drawing Sheets

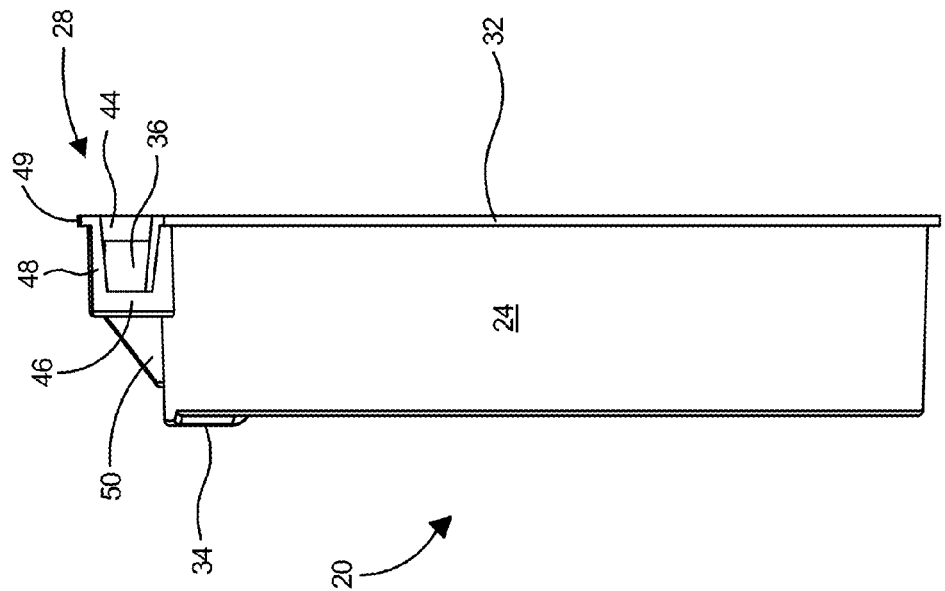
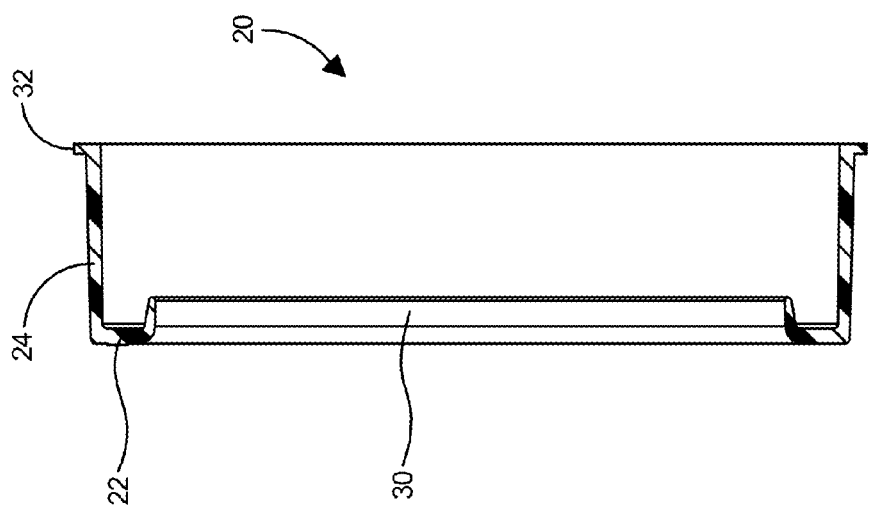

NON-METALLIC SPLIT BUSHING AND METHOD FOR PREVENTING ABRASION OF ELECTRICAL CABLES IN PIPE AND CONDUIT

FIELD OF THE INVENTION

The present invention generally relates to devices for preventing abrasion of cables installed within pipes and electrical conduit.

BACKGROUND OF THE INVENTION

When installing electrical wiring in buildings, electrical cables and wires are commonly routed through metal pipe or conduit. The pipe and conduit are commonly cut to the correct size in order to fit the various runs between junction boxes, outlets, switches and other electrical devices. The cut edges of the pipe and conduit however present a hazard to the cables or wires at their entrances as vibration or temperature caused expansion and contraction can lead to abrasion of the cable sheaths. Manufacturers supply ring-shaped bushings for covering the cut edges of pipes and conduit, however, the ring-shaped bushings must be installed before cable is routed through the pipe or conduit. After cables have been run through the pipes and conduit, a ring-shaped bushing cannot be installed over the cut edges without removing the existing cables, which is impractical and time-consuming. Frequently, in order to accommodate addition of new cables within existing conduit, installers will cut the ring-shaped bushings in half and reinstall the resultant split bushings them on the conduit edges, however the reinstalled split bushing fits loosely on the pipe or conduit and typically does not span the entire periphery of the conduit edge. In order to be qualified for use on electrical conduit, bushings must pass a test specified by Underwriters Lab (UL). UL requires that the bushing remain tightly secured to the conduit while cables are pulled there through. Full ring bushings that have been split by the installers, as a result of the loose fit, typically fail to pass the UL test.

Therefore, what is needed is a device and method for preventing abrasion of electrical cables by the edges of pipe and conduit. The protective device should be capable of being installed on the edges of pipe and conduit after initial installation of the electrical cables therein, and should be capable of passing the UL test. The device should provide a non-abrasive surface for protecting installed electrical cables and wires from direct contact with the cut edges of pipes or conduit, should cover the entirety of the periphery of the conduit edge to which it is attached, and must be capable of being secured tightly to the pipe or conduit in order to meet the UL requirements.

BRIEF SUMMARY OF THE INVENTION

The current invention is a split bushing and method for protecting electrical cables from abrasion by the cut edges of pipe or electrical conduit, also known as electrical metal tubing or EMT. The split bushing includes a substantially ring-shaped body and two cable guides extending from the outer periphery. The bushing includes an end wall and a raised area on the end wall adjacent the split. An overlap extends from the raised area. The bushing includes two ends and two cable guides adjacent the split. After being attached to the end of an electrical conduit, a cable tie is extended through the cable guides and tightened to secure the split bushing tightly to the electrical conduit. The overlap ensures that the entire inner periphery of a conduit will be covered by the bushing when secured thereto.

OBJECTS AND ADVANTAGES

The object of the current invention is to provide a device and method for protecting electrical cables from abrasion by the cut edges of pipe or conduit. A further object is to provide a device and method that can be applied after electrical cables have been installed in the pipe or conduit.

BRIEF DESCRIPTION OF THE SEVERAL VIEWS OF THE DRAWING(S)

Reference is made herein to the accompanying drawings, which are not necessarily drawn to scale, and wherein:

FIG. 4 is a sectional view the split bushing taken along lines 4-4 of FIG. 2.

FIG. 5 is a side view of the split bushing.

DETAILED DESCRIPTION

Figure 1:
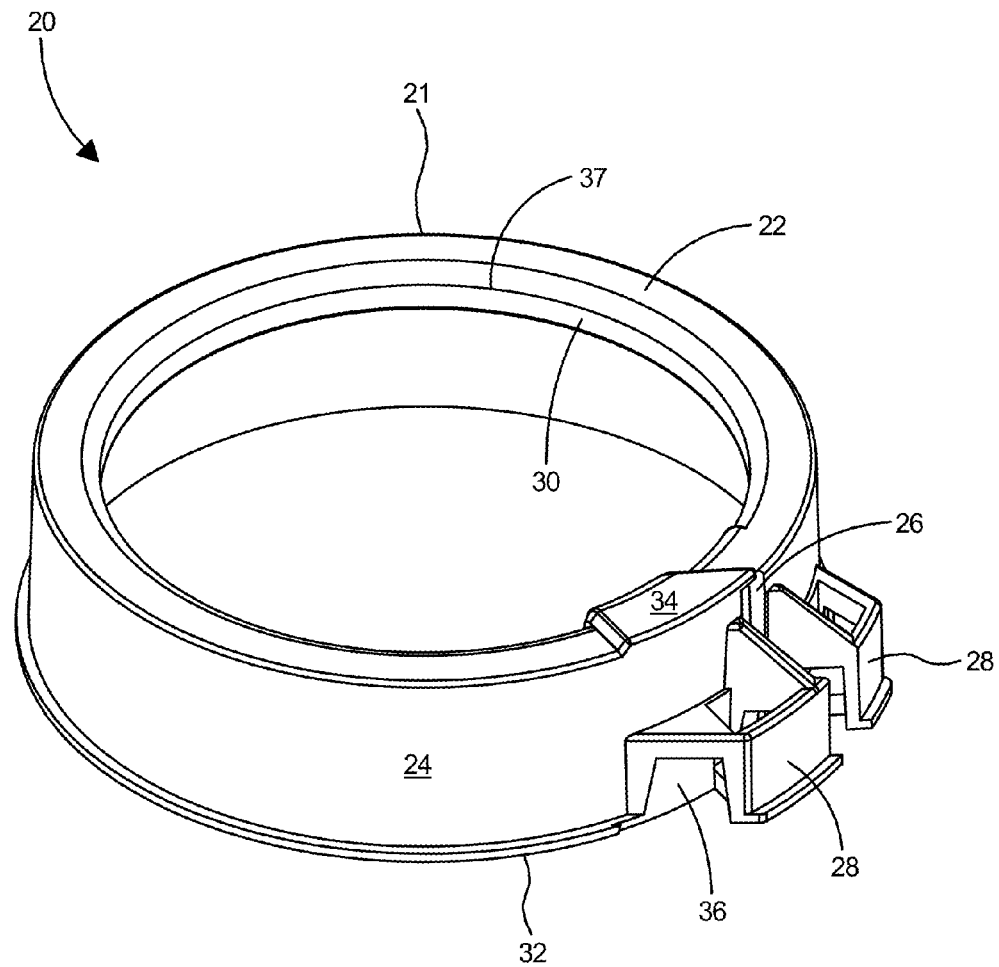
FIG. 1 is a top isometric view of a split bushing for EMT, in accordance with embodiments of the invention.

With reference to FIG. 1, there is shown the preferred embodiment of a split bushing 20 according to the present invention. The split bushing 20 includes a ring-shaped body 21 having an end wall 22, an arcuate peripheral wall 24, and a split 26 extending through the body 21. A cable guide 28 extends from the arcuate peripheral wall 24 on either side of the split 26. The split bushing 20 further includes an inner lip 30, an outer lip 32, a raised area 34 on the end wall 22, and an opening 36 within each cable guide 28. The end wall 22 of the body 21 includes an arcuate inner periphery 37 and the inner lip 30 extends from the arcuate inner periphery 37.

Figure 3:
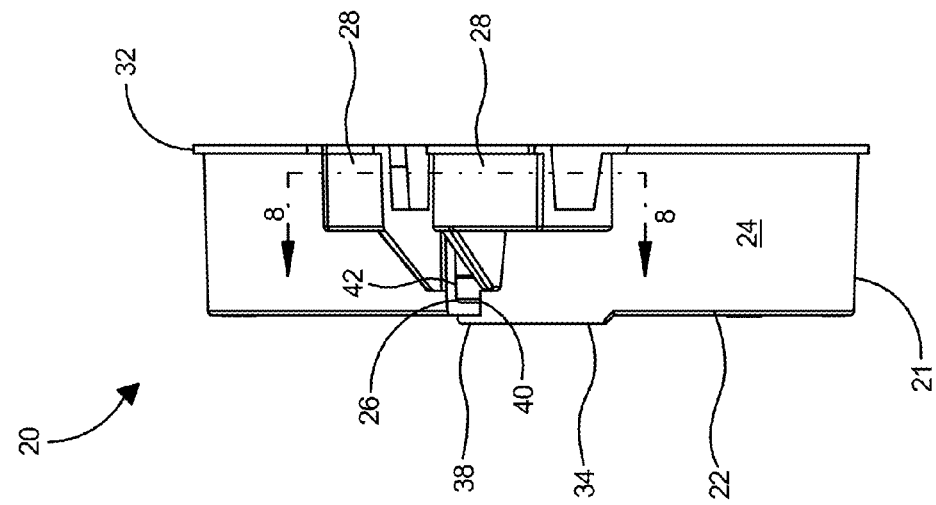
FIG. 3 is a side view of the split bushing.
Figure 2:
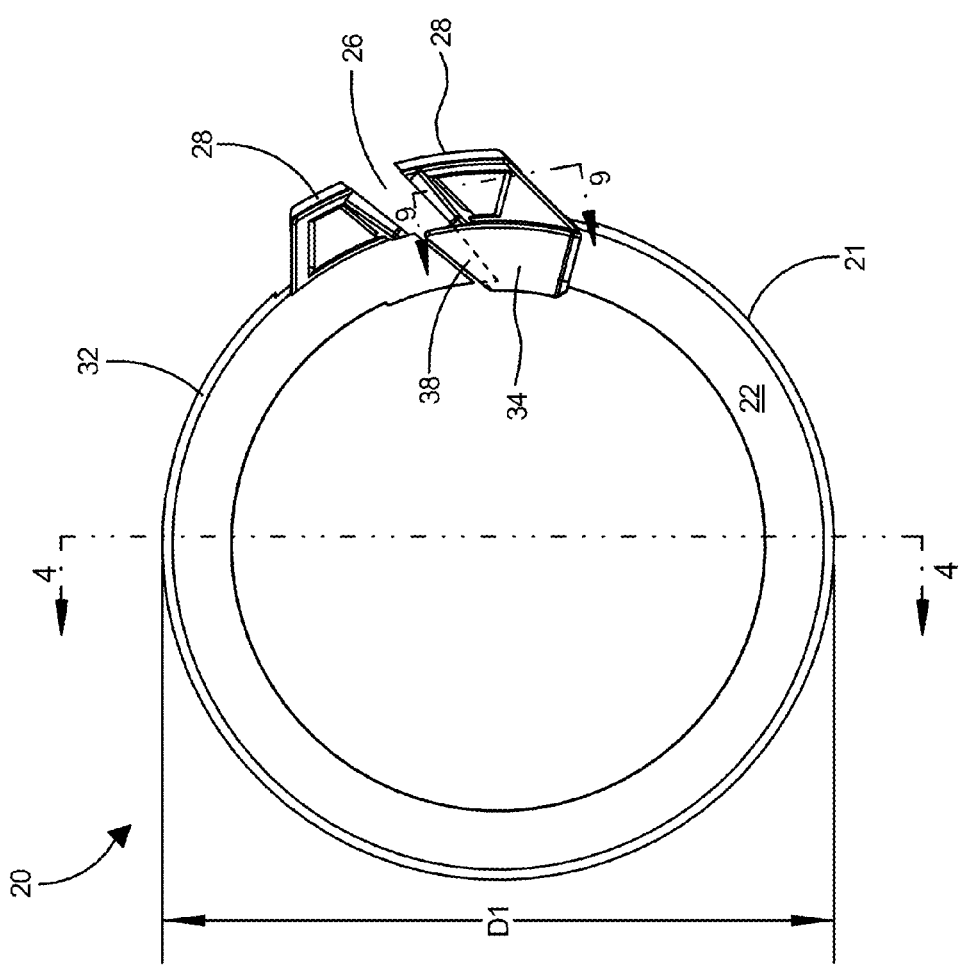
FIG. 2 is a top view of the split bushing of FIG. 1.

Referring to FIGS. 2 and 3, an overlap 38 extends from the raised area 34 at a first end 40 of the body 21 of the split bushing at the split 26. The body 21 of the split bushing 20 further includes a second end 42 at the opposing end of the split 26. When the split bushing is forced closed to narrow its outer diameter al (see FIG. 2), the raised area 34 will extend across a portion of the end wall 22 on the second end 42 of the split bushing 20.

With reference to FIG. 5, the cable guides 28 include a first leg 44 and a second leg 46 extending from the arcuate peripheral wall 24 and an outer wall 48. A lip 49 extends from the outer wall 48 of the cable guide 28. The first leg 44, second leg 46, and outer wall 48 define the opening 36 that extends through the cable guide 28. A brace 50 extends between the arcuate peripheral wall 24 of the split bushing 20 and each cable guide 28 thereby strengthening each cable guide.

Figure 6:
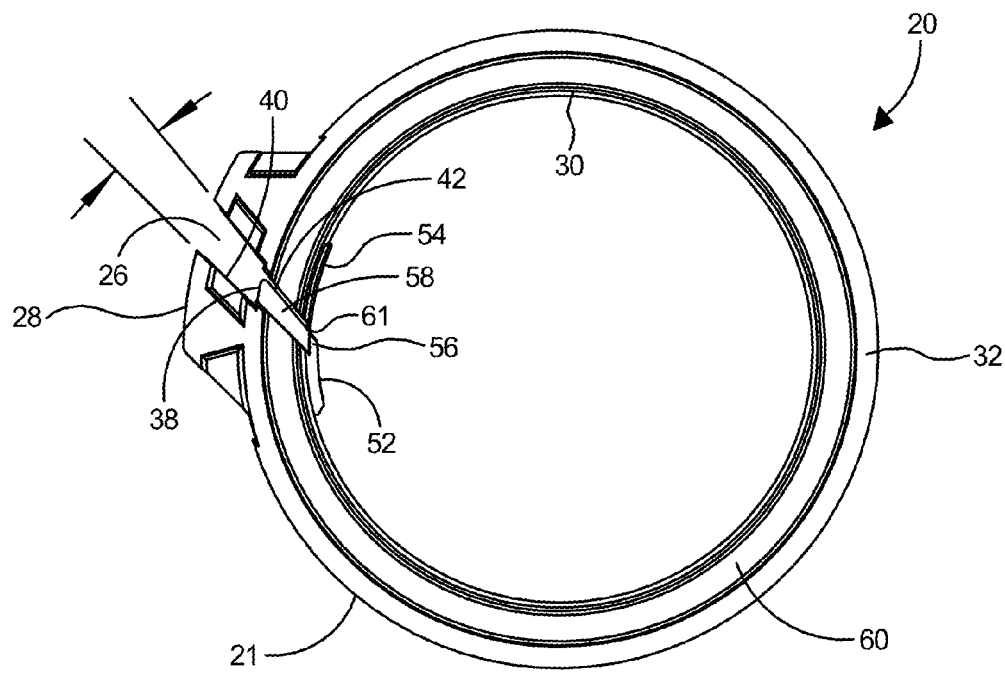
FIG. 6 is a bottom view of the split bushing.
Figure 7:
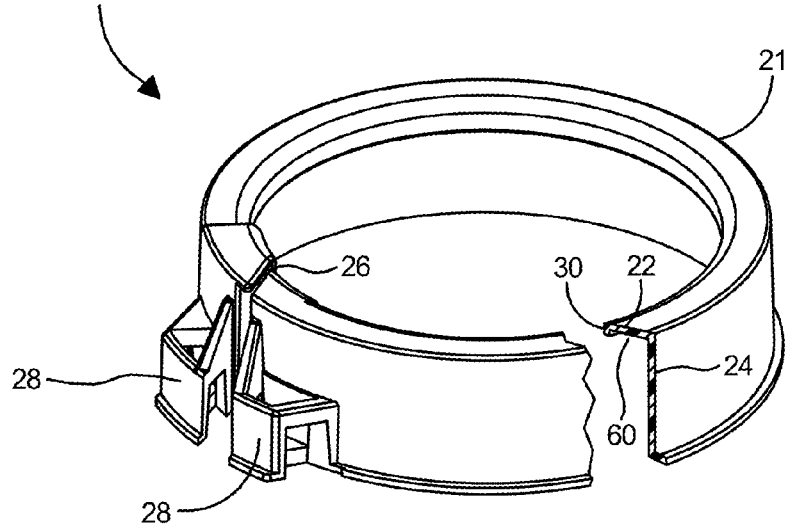
FIG. 7 is an isometric view of the split bushing with a section of the bushing body cut away.
Figure 8:
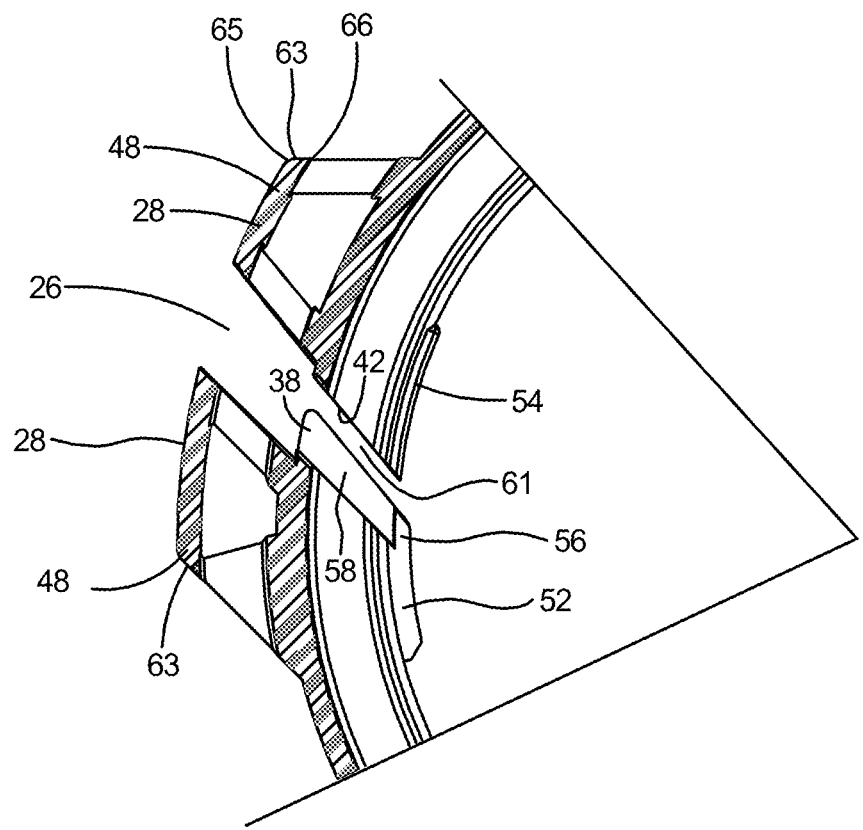
FIG. 8 is a sectional view the split bushing taken along lines 8-8 of FIG. 3.
Figure 9:
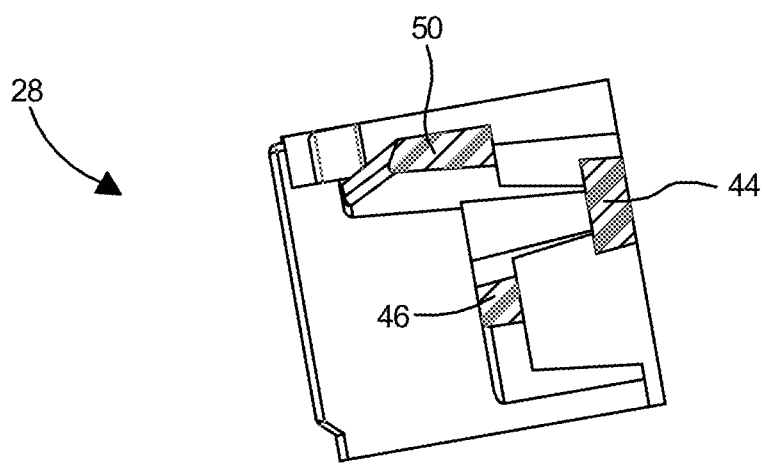
FIG. 9 is a sectional view the split bushing taken along lines 9-9 of FIG. 2.

As shown in FIGS. 6 and 8, inner lip 30 includes a first thickened inner lip section 52 at the first end 40 and a second thickened inner lip section 54 at the second end 42 of the split 26. First thickened inner lip section 52 includes a finger portion 56 extending onto the overlap 38. Finger portion 56, first end 40 of split bushing 20, and overlap 38 define a recess 58 on the first end 40 that accepts second end 42 of split bushing 20 when the split bushing is pushed together. As shown at the cutaway portion of the split bushing 20 in FIG. 7, end wall 22, arcuate peripheral wall 24 and inner lip 30 of body 21 define a channel 60 that is adapted to receive the end of a pipe or conduit (not shown).

As shown in FIG. 8, split bushing 20 includes a gap 61 between the first end 40 and second end 42. When the split bushing is pushed together, second end 42 nests into recess 58 and closes the gap 61 and the overlap 38 on the first end 40 overlaps the end wall 22 on the second end 42 of the split bushing 20. Outer walls 48 of cable guides 28 include sloped outer edges 63. Sloped outer edges 63 are sloped such that the outer walls 48 are narrower at their ends 65 than at their inward edges 66. When a cable tie (not shown) is extended through the cable guides 28 and tightened, sloped outer edges 63 enable the cable tie to more effectively pull the two ends 40 and 42 of the split bushing together and force the split bushing 20 to collapse inward onto an inserted electrical conduit (not shown).

Figure 10:
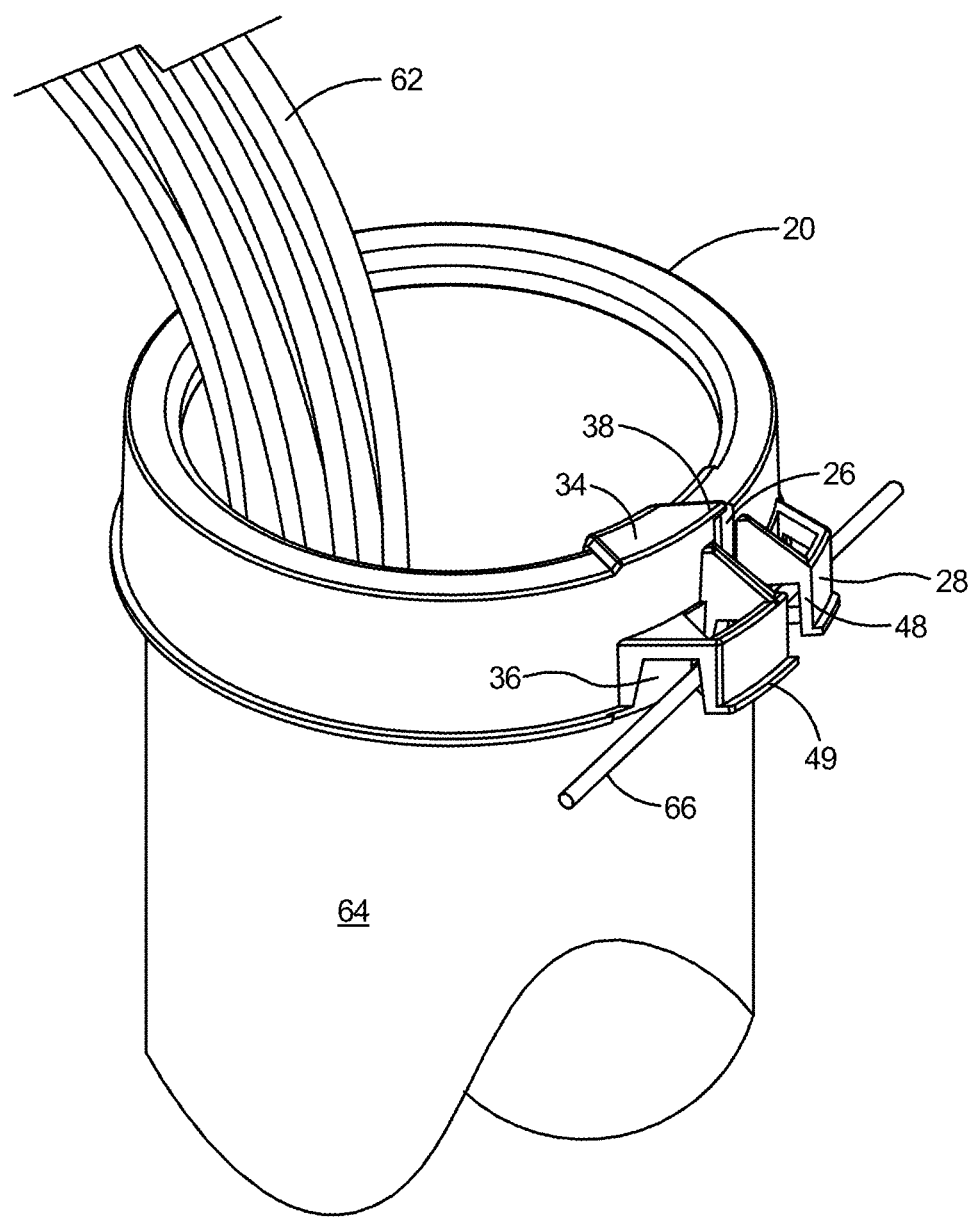
FIG. 10 is an isometric view of the split bushing secured to a section of EMT and depicting electrical wiring inserted into the EMT.

With reference to FIG. 10, the split bushing 20 of the present invention is used to prevent abrasion of electrical cables 62 from the cut ends of pipe or electrical conduit 64. The split bushing of the present invention is especially useful for covering the ends of existing pipes or conduit which have had electrical cables previously installed therein. Prior art bushings are typically ring-shaped and are installed on the conduit ends before cables are installed therein. However, there are many installations in which the installers, as a result of time constraints or a lack of materials, did not initially install bushings on the conduit ends. The split bushing 20 of the present invention provides a means of providing a non-abrasive surface after initial installation and wiring of the conduit. As the split bushing of the current invention is constructed of flexible plastic and includes a split 26 therein, the installer simply pulls on opposing sides of the split bushing, thereby widening the split 26, and slips the split bushing 20 over the electrical cables 62. The split bushing 20 is then pressed onto the conduit 64 until the end of the conduit is fully inserted within the channel 60. The split bushing 20 is then pressed together, thereby closing the gap 61 and enabling the overlap 38 on the first end 40 to overlap the end wall 22 on the second end 42 of the split bushing 20. The split bushing 20 is then securely fastened to the conduit 64 by inserting a cable tie 66, a portion of which is shown in FIG. 10, into the openings 36 of the cable guides 28 and tightening it against the outer walls 48 of the two cable guides 28 surrounding the split 26. After the cable tie 66 is tightened, lip 49 of cable guide 48 prevents the cable tie 66 from slipping off the end of the cable guide 28.

The split bushing 20 (see FIG. 1) of the present invention is preferably constructed of a non-metallic material. Most preferably the split bushing is molded in one piece of plastic. Most preferably, the split bushing is molded in one piece of flame retardant polypropylene.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A split bushing comprising:
    a one-piece ring-shaped body including an end wall and an arcuate peripheral wall;
    a split extending through said body and defining a first end and a second end on said body; and
    a cable guide on each of said ends of said body, said cable guides extending from said arcuate peripheral wall on either side of said split.

2. The split bushing of claim 1, including an overlap extending from said first end of said split bushing at the split.

3. The split bushing of claim 2, wherein said overlap on said first end of said body extends across said end wall on said second end of said body.

4. The split bushing of claim 2, including a raised area at said first end of said body, said overlap extends from said raised area.

5. The split bushing of claim 2, wherein
    said end wall of said body includes an arcuate inner periphery; and
    an inner lip extends from said arcuate inner periphery.

6. The split bushing of claim 5 including a channel defined by said end wall, said arcuate peripheral wall, and said inner lip of said body.

7. The split bushing of claim 5, wherein said inner lip includes a first thickened inner lip section at said first end of said body.

8. The split bushing of claim 7, wherein said first thickened inner lip section includes a finger portion extending onto said overlap.

9. The split bushing of claim 8, including a recess defined by said finger portion, said first end of said body, and said overlap.

10. The split bushing of claim 1, including a second thickened inner lip section at said second end of said body.

11. The split bushing of claim 1, including a gap between said first end and said second end of said body.

12. The split bushing of claim 1 including an opening in each of said cable guides.

13. The split bushing of claim 12 including a cable tie for securing said ends of said body together, said cable tie extending through said openings in said cable guides.

14. The split bushing of claim 1 including a brace extending between said arcuate peripheral wall and each of said cable guides.

15. The split bushing of claim 1 wherein each of said cable guides include a first leg and a second leg extending from said arcuate peripheral wall and an outer wall.

16. The split bushing of claim 15 including a lip extending from said outer wall of said cable guide.

17. The split bushing of claim 15 including sloped outer edges on said outer walls of said cable guides.

18. A method for preventing abrasion of electrical cables by the end of an electrical conduit, the method comprising:
    providing a split bushing including a one-piece ring-shaped body having an end wall and an arcuate peripheral wall, a split extending through said body and defining a first end and a second end on said body, a channel defined by said end wall, said arcuate peripheral wall, and an inner lip on said body, a cable guide on each of said ends of said body, said cable guides extending from said arcuate peripheral wall, and openings in said cable guides;
    pulling on opposing sides of said split bushing;
    slipping said split bushing over said electrical cables;

pressing said split bushing onto the conduit until the end of the conduit is fully inserted within said channel of said split bushing;
inserting a cable tie through said openings of said cable guides; and
tightening said cable tie against said cable guides to secure said split bushing to said electrical conduit.

19. The method of claim 18, including
providing an overlap extending from said first end of said body; and
pressing said split bushing together until said overlap on said first end overlaps said end wall on said second end of said split bushing.

20. A split bushing comprising:
a one-piece ring-shaped body including an end wall and an arcuate peripheral wall;
a split extending through said body and defining a first end and a second end on said body;
a cable guide on each of said ends of said body, said cable guides extending from said arcuate peripheral wall on either side of said split; and
an overlap extending from the end wall at said first end of said split bushing, said overlap adapted to overlap the end wall on said second end of said body upon closure of said ends.

* * * * *